United States Patent Office 3,109,499
Patented Nov. 5, 1963

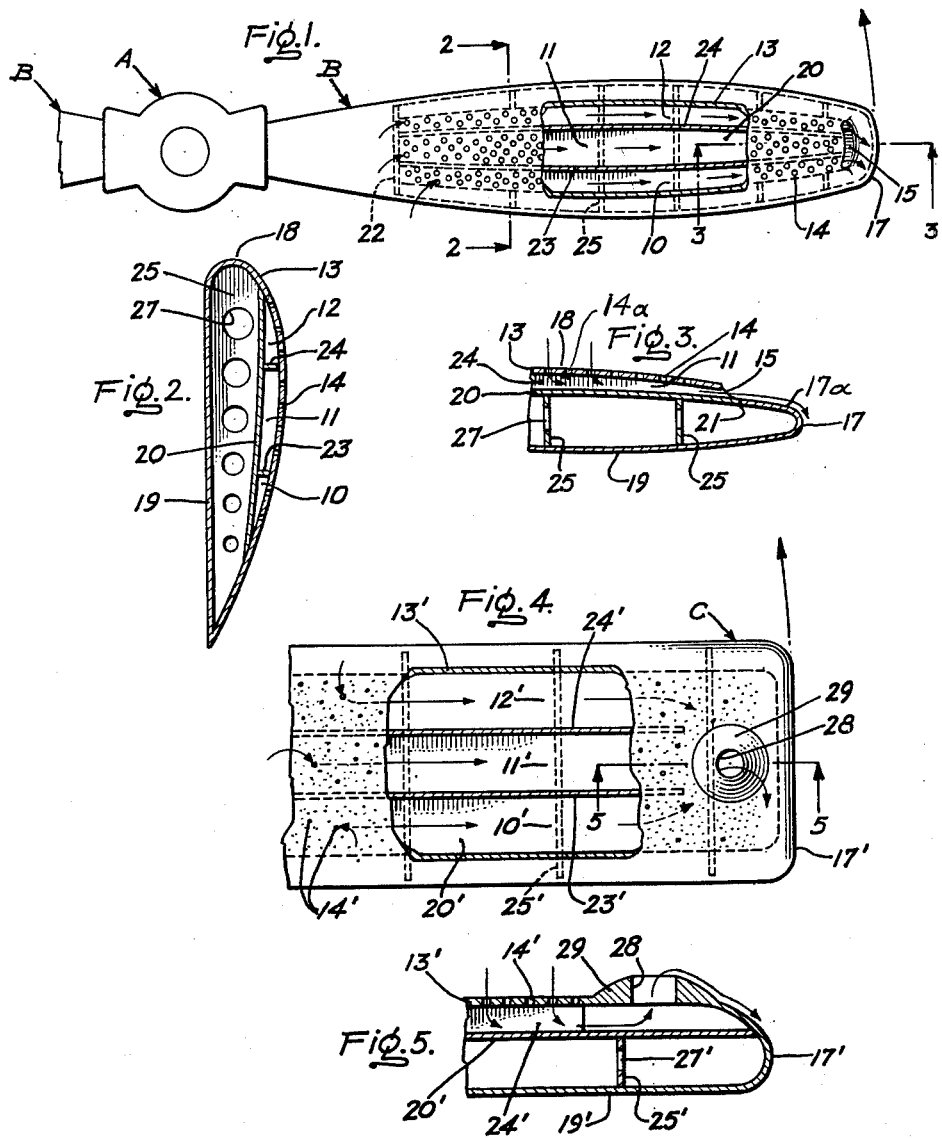

3,109,499
AIRCRAFT PROPELLER WITH CENTRIFUGALLY
INDUCED AIR FLOW CONTROL FEATURES
Fritz Klein, 14520 Debell Drive, Los Altos Hills, Calif.
Filed May 29, 1961, Ser. No. 113,242
1 Claim. (Cl. 170—172)

The present invention relates to propellers, and pertains more particularly to a method and mechanism for employing centrifugally induced forces for improving the air flow characteristics over certain areas of a propeller blade.

The invention is particularly adapted for use with the blades of aircraft propellers, such as those of propeller driven airplanes and helicopters. It is well known that when an airfoil exerting lift advances through the air at high speed, that such movement generates eddy currents over the forward or upper surface of such airfoil, and that such eddy currents add substantially to the drag of such airfoil.

In the past attempts have been made to control the flow of air along such forward or upward surfaces of such airfoils, but such attempts have generally been directed toward variations in the curvature or camber of the surfaces of such airfoils, or in the provision of slots or tabs supplemental to such surfaces.

The pressure invention provides a method and mechanism for controlling the movement and turbulence of boundary layer air along the forward surface of a propeller blade for use in the propellers of propeller driven airplanes and in helicopter rotors.

A further object of the invention is to employ the centrifugal force of a mass of air in a whirling, airfoil type blade for creating suction along the forward surface of such blade and for feeding the air drawn in from the forward boundary layer of air of such airfoil into the tip vortex thereof to thereby induce turbulence and resultant induced drag.

A further object of the invention is to divide an inner portion of an aircraft propeller into a plurality of channels extending lengthwise of the blade, the channels being closed at their inner ends and open to the atmosphere at their outer ends, each of said channels communicating with the atmosphere along the forward or upper surface of such blade, whereby, when the propeller is rotating rapidly, centrifugal force drives the air radially outwardly along said channels and into the atmosphere at their outer ends, thereby tending to draw air into the channels from the atmosphere along the forward or upper surface of such blade.

These, and other objects and advantages of the invention, will be apparent from the following description and the accompanying drawings, wherein:

FIG. 1 is a fragmentary, front elevational view of a propeller hub portion with one hollow propeller blade embodying the invention mounted therein, a portion of the forward surface of the propeller blade being broken away to show the radial channels therein.

FIG. 2 is an enlarged, transverse sectional view taken along line 2—2 of FIG. 1.

FIG. 3 is a similarly enlarged, fragmentary, radial, sectional view taken along line 3—3 of FIG. 1.

FIG. 4 is a fragmentary, plan view of the tip portion of a helicopter blade embodying the invention, a portion of the upper blade wall being broken away to show the radially extending channels therein.

FIG. 5 is an enlarged, fragmentary, longitudinal, sectional view taken along line 5—5 of FIG. 4.

Briefly, as illustrated in FIGS. 1–3, the invention comprises an aircraft propeller A having blades B, each blade having one or more longitudinally extending passages, 10, 11 and 12 formed therein. The forward blade wall 13 overlying these passages is perforated with a plurality of apertures 14 to provide communication between the blade passages and the atmosphere forwardly of the propeller blade. The passages 10, 11 and 12 are sealed off at their inner ends, and are open to the atmosphere at their outer ends through a common, elongated exit opening 15. This exit opening 15 is preferably faired smoothly into the forward propeller surface just inwardly of the blade tip 17. As the propeller A is rotatively driven at operative speeds, the mass of air within the passages 10, 11 and 12 is subjected to centrifugal force, which tends to drive this air radially outwardly through the common opening 15. The resultant reduction of pressure within the passages 10, 11 and 12 tends to suck air into these passages through the foraminous front blade wall 13 from the boundary layer 18 of air along the forward or upward side of each blade B. By suitable selection of the size, nature and distribution of the apertures 14 or pores in the forward blade wall 13, the air flow therethrough into the passages 10, 11 and 12 may be controlled as required to influence the eddy currents and turbulence in the forward boundary layer 18 of air produced by the rotation of the propeller A.

Referring to the form of the invention shown in FIGS. 1–3 in greater detail, the propeller A may be of conventional construction except for the herein described features of the present invention embodied in the blades B thereof. Since the details of such conventional propeller construction are well known to those familiar with the art, it will be unnecessary to describe or illustrate them herein.

Each hollow propeller blade B comprises a rear wall 19 and forward wall 13, curved to conform to the design of each particular propeller blade involved. A longitudinally extending transverse partition 20 is mounted chordally of the arc of transverse curvature of the forward blade wall 13. This partition 20 is sealed along its sides to the forward blade wall 13, and at its radially outer end is joined at 21 (FIG. 3) in abutted, smoothly contoured relation, with the portion of the forward blade wall 13 which defines the rear side of the exit opening 15. A transverse wall 22 (FIG. 1) seals off the inner end of the space between the forward blade wall 13 and the partition 20. This space is divided lengthwise thereof into the three passages 10, 11 and 12 by two longtiudinally extending partitions 23 and 24, each of which extends between the partition 20 and the forward blade wall 13, and are sealed to both thereof. A plurality of usual transverse, interior, stiffening webs 25 preferably are provided at selected distances throughout the length of the blade B and extend between the partition 20 and the rear blade wall 19. These webs 25 are lightened in a customary manner by having a plurality of lightening holes 27 therein. Communication between the interior of the passages 10, 11 and 12 and the atmosphere forwardly of the forward blade wall 13 may be through a plurality of apertures 14 in the forward blade wall 13. These apertures may be of selected sizes and shapes, and at selected locations, to provide a required air inflow into the passages 10, 11 and 12. Since this required air flow will obviously vary in accordance with the design and operating characteristics of the blade, and with the numerous other variables to which an aircraft propeller blade is subjected in use, the size, shape, nature and locations of these openings will be determined by the design characteristics of each blade. Instead of actual open apertures or passages, it may be preferred to employ restricted openings, or to employ a porous material such as sintered metal for selected portions of the front blade wall 13. If no porous skin or wall material of suitable strength can be provided, it may be preferred to fill apertures, such as aperture 14a (FIG. 3), in the forward blade wall with sintered metal plugs or other porous or foraminous material.

In operation, the centrifugal force exerted on the air columns in the passages 10, 11 and 12 during operative rotation of the propeller A urges the air in these columns radially outwardly, in the nature of a centrifugal impeller. The air exits smoothly at high velocity from these passages through the common exit opening 15, and, as indicated by the arrows emanating from this exit opening in FIGS. 1 and 3, follows the forward tip surface 17a as indicated in FIG. 3 and thereby tends to eliminate or reduce the usual tip vortex and its resultant induced drag.

The action of centrifugal force in urging the air outwardly in the passages 10, 11 and 12 reduces the pressure within these passages, and thereby tends to draw air from the boundary layer 18 of air over the forward face of the propeller blade B into these passages. Such induced air flow tends to reduce the turbulence of the boundary layer of air flowing over the forward blade surface, and thereby to increase the efficiency and to reduce the drag of the propeller.

In the modified form of the invention for a helicopter rotor blade C shown in FIGS. 4 and 5, the principal change resides in the exit opening 28. The reason for this change will be obvious to one familiar with the action of the ambient air on a helicopter blade during a forward movement of the helicopter. In such case, each time a rotor blade points forwardly in the direction of flight, there results a component of air movement radially inwardly along the blade. Such component would tend to counteract the outward flow of air from the passages in the blade under the action of centrifugal force if a radially outward exit opening were provided such as the exit opening 15 of FIGS. 1 and 3. For this reason the exit opening 28 for a helicopter blade C is preferably directed upwardly, as illustrated in FIGS. 4 and 5. This exit opening 28 preferably is formed in a slightly thickened boss 29, which is faired smoothly into the surrounding blade tip surfaces. In other respects the helicopter blade C of FIGS. 4 and 5 is generally similar to the propeller blade B shown in FIGS. 1 and 3, and the corresponding parts of the blade C are designated by the same reference numerals as those employed for the blades B of FIGS. 1–3, with the prime (′) added. The structure and operation of the helicopter blade C shown in FIGS. 4 and 5 will, therefore, be apparent to anyone familiar with the art who has perused the foregoing description of the propeller blade A illustrated in FIGS. 1–3.

While a blade structure employing a plurality of three longitudinal passages 10, 11 and 12 with a single common exit opening therefrom is shown in the embodiments of the invention illustrated in FIGS. 1–5 of the accompanying drawings, the number and shape of these passages and the number and shape of the exit openings therefrom are not material to the invention. It is contemplated, therefore, that it may be found advisable after fully checking the flow and operating characteristics of the invention with respect to several different types of blades to modify such features of the invention in a manner which will be obvious to a designer or engineer of ordinary ability.

The term "propeller," as used in the present description and claim, is intended to include aircraft propellers, helicopter rotors and other rotary driven airfoils for driving and lifting aircraft, and the term "forward" as applied thereto is also intended to mean "upward" in the case of a vertical lift rotor or propeller.

The invention provides a simple and inexpensive structure for the control of turbulence in the boundary layer of air along the forward or upward side of an aircraft propeller blade, and for feeding air drawn from such boundary layer into the tip flow of such blade.

While I have illustrated and described a preferred embodiment of the present invention, and one modified form thereof, it will be understood, however, that various changes and modifications may be made in the details thereof without departing from the scope of the invention as set forth in the appended claim.

Having thus described the invention, what I claim as new and desire to protect by Letters Patent is defined in the following claim.

I claim:

An aircraft blade having a passage lengthwise therein such passage being sealed at its inner end and extending lengthwise of the propeller blade and having an exit opening to the atmosphere adjacent the tip of said blade, said passage having communication with the atmosphere through a plurality of inlet apertures provided throughout a substantial longitudinal and transverse area of the forward surface of the blade, the exit opening to the atmosphere from said passage being located on the forward surface of the blade, just inwardly of the tip vortex area thereof, the blade tip surface at and beyond the exit opening being smoothly faired on both front and rear tip surfaces toward the blade tip extremity, whereby air flowing outwardly through such exit opening follows the surface of the blade to the tip extremity thereof and thereby tends to reduce the usual tip vortex of the blade.

References Cited in the file of this patent

UNITED STATES PATENTS

| | | |
|---|---|---|
| 736,952 | Fox | Aug. 25, 1903 |
| 1,018,223 | Wieland | Feb. 20, 1912 |
| 2,156,133 | Troller | Apr. 25, 1939 |
| 2,645,435 | Pouit | July 14, 1953 |

FOREIGN PATENTS

| | | |
|---|---|---|
| 325,346 | Italy | Mar. 9, 1935 |
| 85,277 | Sweden | Jan. 14, 1936 |